United States Patent
Shimizu et al.

(10) Patent No.: US 11,644,324 B2
(45) Date of Patent: May 9, 2023

(54) DANGEROUS PLACE IDENTIFICATION DEVICE, MAP DATA, DANGEROUS PLACE IDENTIFICATION METHOD, AND PROGRAM

(71) Applicant: PIONEER CORPORATION, Tokyo (JP)

(72) Inventors: Akira Shimizu, Saitama (JP); Makoto Matsumaru, Saitama (JP); Ryoji Noguchi, Saitama (JP); Itaru Takemura, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 245 days.

(21) Appl. No.: 16/764,363

(22) PCT Filed: Nov. 9, 2018

(86) PCT No.: PCT/JP2018/041596
§ 371 (c)(1),
(2) Date: May 14, 2020

(87) PCT Pub. No.: WO2019/098124
PCT Pub. Date: May 23, 2019

(65) Prior Publication Data
US 2020/0355511 A1 Nov. 12, 2020

(30) Foreign Application Priority Data
Nov. 14, 2017 (JP) .............................. JP2017-218799

(51) Int. Cl.
*G01C 21/34* (2006.01)
*G08G 1/16* (2006.01)
*G01C 21/00* (2006.01)

(52) U.S. Cl.
CPC ...... *G01C 21/3461* (2013.01); *G01C 21/3492* (2013.01); *G01C 21/3811* (2020.08); *G08G 1/166* (2013.01)

(58) Field of Classification Search
CPC ............ G01C 21/3461; G01C 21/3492; G01C 21/3807; G01C 21/3691; G01C 21/369;
(Continued)

(56) References Cited

U.S. PATENT DOCUMENTS

| 8,289,187 B1 | 10/2012 | Kerr |
| 2012/0158285 A1 | 6/2012 | Yamazaki et al. |

(Continued)

FOREIGN PATENT DOCUMENTS

| JP | 2003-330360 A | 11/2003 |
| JP | 2006258428 A | 9/2006 |

(Continued)

OTHER PUBLICATIONS

Extended European Search Report dated May 27, 2021, for corresponding EP patent application No. 18877492.1, 12 pages.
(Continued)

*Primary Examiner* — Adam R Mott
*Assistant Examiner* — Erick T. Detweiler
(74) *Attorney, Agent, or Firm* — Procopio, Cory, Hargreaves & Savitch LLP

(57) ABSTRACT

The present invention identifies a danger spot effectively. In a navigation device 10, a danger spot identification unit 34 identifies a jump-out danger spot on the basis of past information which is acquired by a past information acquisition unit 24 and indicates a situation of a jump-out accident in the past, and surrounding information which is acquired by a surrounding information acquisition unit 32 and indicates a surrounding situation of a vehicle. Here, the past information includes surrounding facility identification (Continued)

information (information related to an identification planimetric feature) used for identifying a jump-out danger spot and information related to a jump-out object. As a result, the danger spot identification unit 34 can identify a danger spot of a jump-out which can occur due to a planimetric feature (a facility) in a jump-out accident. Therefore, the navigation device 10 can identify a jump-out danger spot effectively.

6 Claims, 5 Drawing Sheets

(58) Field of Classification Search
CPC ............ G01C 21/3476; G01C 21/36; G01C 21/3602; G01C 21/3694; G01C 21/20; G01C 21/3423; G01C 21/3484; G01C 21/3617; G01C 21/3407; G01C 21/28; G01C 21/005; G01C 21/3867; G08G 1/166; G08G 1/09; G08G 1/16; G08G 1/0967; G08G 1/167; G08G 1/168; G08G 1/04; G08G 1/052; G08G 5/0013; G08G 5/0026; G08G 5/003; G08G 5/0039; G08G 5/0043; G08G 5/0069; G08G 5/0082; G08G 5/045; G09B 29/10; B60W 30/08; B60W 30/095; B60W 30/0956; B60W 60/0015; B60W 60/0018; B60W 60/00182; B60W 60/00184; B60W 60/00186; B60W 60/00188; B60W 2556/00; B60W 2556/10; B60W 2040/0818; B60W 2050/143; B60W 2554/404; B60W 2554/4046; B60W 2554/406; B60W 40/04; B60W 40/09; B60W 50/14; B60W 60/0053; B60W 60/0059; B60W 2420/42; B60W 30/09; B60W 30/018163; B60W 2554/00; G05D 1/0214; G05D 2201/0213; G05D 1/0246; G05D 1/0088; G05D 1/0253; G05D 1/0221; G05D 1/0231; G05D 2201/0202

See application file for complete search history.

(56) References Cited

U.S. PATENT DOCUMENTS

| 2017/0234689 A1* | 8/2017 | Gibson | B60W 50/14 |
| | | | 701/25 |
| 2019/0031198 A1* | 1/2019 | Aoki | B60W 40/02 |
| 2019/0087668 A1* | 3/2019 | Kim | G08G 1/0967 |

FOREIGN PATENT DOCUMENTS

| JP | 2010066827 A | 3/2010 |
| JP | 2012127770 A | 7/2012 |
| JP | 2017117148 A | 6/2017 |
| WO | 2017030493 A1 | 2/2017 |

OTHER PUBLICATIONS

Schreiber Marcel, "Innerörtliche Unfälle mit Fußgängern und Radfahrern", Unfallforschung Kompakt, [Online] No. 39, Oct. 31, 2013 (Oct. 31, 2013), XP055805132, Retrieved from the Internet: URL:https://udv.de/system/files_force/tx_uDvpublications/uko_39_ bln_fg_rf.pdf> [retrieved on May 18, 2021] and it's English machine translation.

International Search Report and Written Opinion for related Int. App. No PCT/JP2018/041596 dated Feb. 12, 2019. English translation of ISR provided; 6 pages.

* cited by examiner

| Past information | | | | |
|---|---|---|---|---|
| Moving object identification information | Feature identification information | | Weather identification information | Time identification information |
| | Surrounding facility identification information | Road feature identification information | | |
| Jump-out object | • First facility information<br>• Second facility information<br>• Facility related information | • Separator between roadway and walkway<br>• Presence or absence of pedestrian crossing traffic lights<br>• Distance from pedestrian crossing<br>• Road information | Weather information at time of accident | Hour of day at time of accident |
| • Pedestrian<br>• Four-wheel vehicle<br>• Two-wheel vehicle | | | | |

Fig. 2

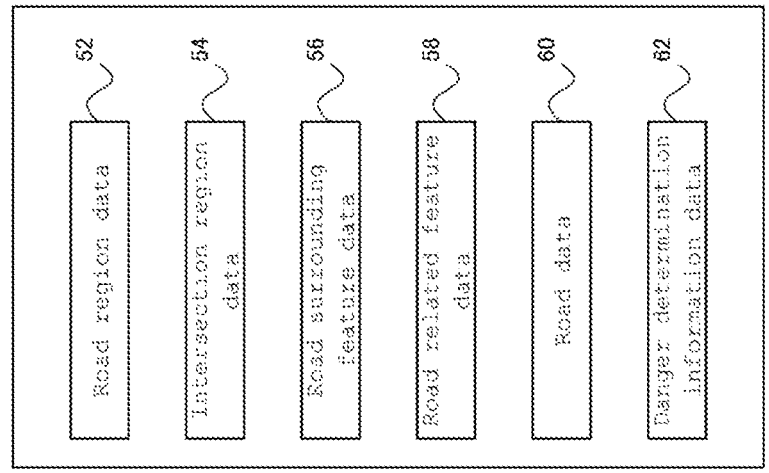

| ID | Position information | Jump-out object | Identified feature | Danger situation information |
|---|---|---|---|---|
| 1 | Latitude:×× Longitude:○○ | Pedestrian | Department store | Jump-out accident involving road-crossing pedestrian |
| 2 | Latitude:△△ Longitude:□□ | Four-wheel vehicle | Parking lot exit | Jump-out accident involving vehicle exiting parking lot |
| 3 | Latitude:◇◇ Longitude:▽▽ | Two-wheel vehicle | Parking lot entrance | Jump-out accident involving vehicle entering parking lot |
| ... | ... | ... | ... | ... |

DANGEROUS PLACE IDENTIFICATION DEVICE, MAP DATA, DANGEROUS PLACE IDENTIFICATION METHOD, AND PROGRAM

CROSS-REFERENCE TO RELATED APPLICATIONS

This application is a U.S. National Stage entry of PCT Application. No. PCT/JP2018/041596, filed on Nov. 9, 2018, which claims priority to JP Application No. 2017-218799, filed Nov. 14, 2017. The contents of the foregoing are incorporated by reference.

TECHNICAL FIELD

The present invention relates to a danger spot identification device, map data, a danger spot identification method, and a program.

BACKGROUND ART

Patent Literature 1 below discloses a driving support system which determines whether or not a vehicle is positioned at a danger point. Specifically, in this driving support system, similarity is calculated between the situation of a vehicle at the time of a traffic accident included in the past traffic accident history and the current situation of a vehicle, to thereby determine whether or not the vehicle is positioned at a danger point. As a result, the driver can be alerted even for an unknown danger point.

CITATION LIST

Patent Literature

[Patent Literature 1] Japanese Unexamined Patent Application, First Publication No. 2010-0066827

SUMMARY OF INVENTION

Technical Problem

Incidentally, in a traffic accident such as a jump-out accident, for example, a person or a vehicle may, in some cases, jump out to the roadway due to a planimetric feature positioned on a side of the road. However, in the above driving support system, while the driving situation of a vehicle, the traveling status of the vehicle, and the surrounding environment of the vehicle are given as a situation of the vehicle, planimetric features around an accident spot are not taken into consideration. Therefore, there is still room for improvement in the above driving support system in terms of effectively identifying a danger spot. Accordingly, the problem mentioned above can be taken as an example of the problem to be solved by the present invention.

The present invention has been made in view of the above problem taken as an example, and a primary purpose of the invention is to provide a danger spot identification device, map data, a danger spot identification method, and a program capable of identifying a danger spot effectively.

Means for Solving Problem

The invention according to claim 1 is a danger spot identification device comprising: a past information acquisition unit for acquiring past information which is generated on the basis of an event in the past and is used for identifying a danger spot, and which includes information related to the event; a surrounding information acquisition unit for acquiring surrounding information related to a surrounding situation of a moving object; and a danger spot identification unit for identifying a danger spot within a region of movement of the moving object, on the basis of the past information and the surrounding information.

The invention according to an exemplary aspect is directed to map data comprising danger determination information for determining a danger using surrounding information which is acquired by an information acquisition unit and relates to a surrounding situation of a moving object, wherein the danger determination information stores a situation where a danger can occur in a predetermined region, the situation being associated with the predetermined region included in the map data.

The invention according to another exemplary aspect is directed to a danger spot identification method in a danger spot identification device which includes a past information acquisition unit, a surrounding information acquisition unit, and a danger spot identification unit, the danger spot identification method comprising: a first step in which the past information acquisition unit acquires past information which is generated on the basis of an event in the past and is used for identifying a danger spot, and which includes information related to the event; a second step in which the surrounding information acquisition unit acquires surrounding information related to a surrounding situation of a moving object; and a third step in which the danger spot identification unit identifies a danger spot within a region of movement of the moving object, on the basis of the past information and the surrounding information.

The invention according to another exemplary aspect is directed to a non-transitory computer readable medium storing a program which causes a computer to execute a danger spot identification method in a danger spot identification device including a past information acquisition unit, a surrounding information acquisition unit, and a danger spot identification unit, the program comprising: a first step in which the past information acquisition unit acquires past information which is generated on the basis of an event in the past and is used for identifying a danger spot, and which includes information related to the event; a second step in which the surrounding information acquisition unit acquires surrounding information related to a surrounding situation of a moving object; and a third step in which the danger spot identification unit identifies a danger spot within a region of movement of the moving object, on the basis of the past information and the surrounding information.

BRIEF DESCRIPTION OF THE DRAWINGS

FIG. 2 is a diagram showing an example of past information acquired by a past information acquisition unit of the navigation device shown in FIG. 1.

FIG. 5A is a diagram showing an example of a structure of map data generated on the basis of jump-out danger spots identified by the navigation device shown in FIG. 1, and FIG. 5B is a diagram showing an example of danger determination information data of FIG. 5A.

DESCRIPTION OF EMBODIMENTS

Figure 1:
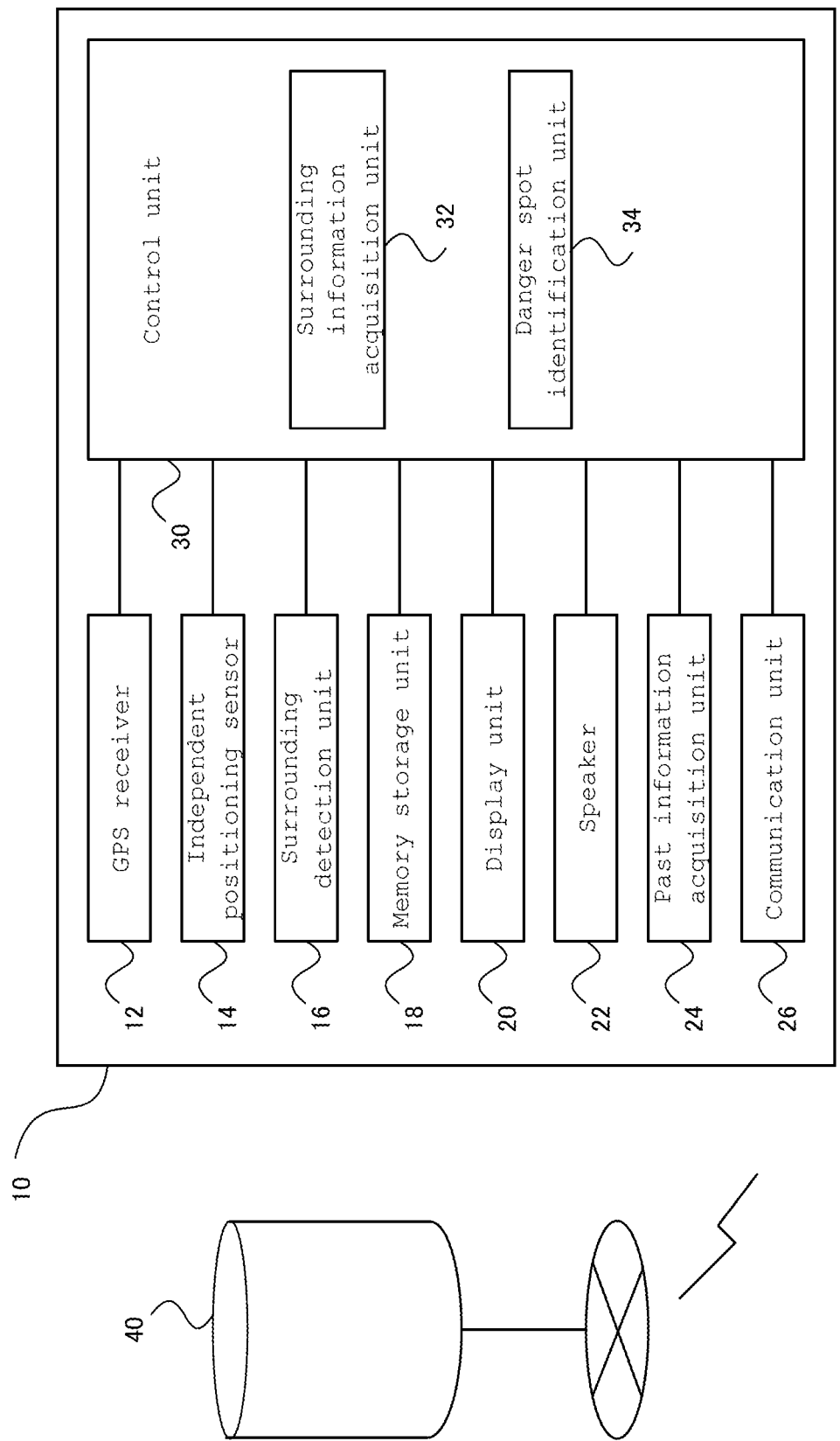
FIG. 1 is a block diagram showing a configuration of a navigation device according to the present working example.

One aspect of a danger spot identification device of the present embodiment includes: a past information acquisition unit for acquiring past information which is generated on the basis of an event in the past and is used for identifying a danger spot, and which includes information related to the event; a surrounding information acquisition unit for acquiring surrounding information related to a surrounding situation of a moving object; and a danger spot identification unit for identifying a danger spot within a region of movement of the moving object, on the basis of the past information and the surrounding information.

According to the danger spot identification device configured as mentioned above, the past information acquisition unit acquires past information generated on the basis of an event in the past. The surrounding information acquisition unit acquires surrounding information related to the surrounding situation of a moving object. The danger spot identification unit identifies a danger spot within a region of movement of the moving object, on the basis of the past information and the surrounding information.

Here, the past information includes information which is used to identify a danger spot and relates to a past event. As a result, the danger spot identification unit can identify a spot of a danger which can occur due to a past event. Therefore, a danger spot can be identified effectively.

Another aspect of the danger spot identification device of the present embodiment is such that: the past information includes information related to an occurrence of an accident in the past; and the danger spot identification unit identifies a danger spot on the basis of past information on a region at the time of the accident where the accident occurred, and on the surrounding information.

According to the danger spot identification device configured as mentioned above, the past information includes information related to occurrences of accidents in the past. Therefore, the danger spot identification unit can effectively identify a danger spot on the basis of an event in the past such as a jump-out accident.

Another aspect of the danger spot identification device of the present embodiment is such that: the past information includes information related to a relevant moving object, which is a moving object related to the accident, and a planimetric feature, the relevant moving object and the planimetric feature facing each other across a road; and the danger spot identification unit identifies a danger spot on the basis of a degree of similarity between a surrounding situation indicated by the surrounding information and a positional relationship between the relevant moving object and the planimetric feature in the region where the accident occurred.

According to the danger spot identification device configured as mentioned above, it is possible to more effectively identify a danger spot of a jump-out accident which can occur due to a planimetric feature, for example. That is to say, for example, in a jump-out accident, there is a possibility that a pedestrian may cross the road (roadway) due to a facility which is present across the road. Accordingly, when the relevant moving object is a pedestrian for example, the danger spot identification unit can identify a danger spot on the basis of the type of the planimetric feature which is present across the road from the pedestrian and the positional relationship between the pedestrian and the planimetric feature. Therefore, it is possible to effectively identify a danger spot of a jump-out accident which can occur due to a planimetric feature.

Another aspect of the danger spot identification device of the present embodiment is such that: the information related to a planimetric feature includes information related to relevance between a first facility and a second facility facing each other across the road; and the danger spot identification unit identifies a danger spot on the basis of a surrounding situation indicated by the surrounding information and relevance between the first facility and the second facility in a region where an accident occurred.

According to the danger spot identification device configured as mentioned above, it is possible to even more effectively identify a danger spot of a jump-out accident which can occur due to a planimetric feature, for example. That is to say, for example, in a jump-out accident, there is a possibility that a pedestrian may cross the road on the basis of relevance between a first facility and a second facility facing each other across the road. More specifically, for example, in a case where the first facility is a commercial facility and the second facility is a parking lot owned by the commercial facility, there is a possibility that a user who uses the commercial facility may cross the road at a point where the first facility and the second facility face each other. Accordingly, the danger spot identification unit can identify a danger spot on the basis of the positional relationship between the first facility and the second facility and the pedestrian. Therefore, it is possible to more effectively identify a danger spot of a jump-out accident which can occur due to a planimetric feature.

Another embodiment of the present invention is map data including danger determination information for determining a danger using surrounding information which is acquired by an information acquisition unit and relates to a surrounding situation of a moving object, wherein the danger determination information stores a situation where a danger can occur in a predetermined region, the situation being associated with the predetermined region included in the map data.

According to the above configuration, since the map data is of a data structure which includes the danger determination information, a danger which can occur while a moving object is moving can be predicted by using the map data, and a notification of the predicted danger can be issued. The danger determination information stores a situation where a danger can occur in a predetermined region, the situation being associated with the predetermined region included in the map data. As a result, it is possible to issue a notification of a content on the basis of a situation where a danger can occur.

Another aspect of the map data of the present embodiment is such that the danger determination information includes a relationship between a planimetric feature present in the predetermined area and a relevant moving object, which is a moving object possibly related to an accident.

According to the above configuration, it is possible, on the basis of a relationship between a planimetric feature present in a predetermined area and a relevant moving object possibly related to an accident, to predict a danger which can occur while the moving object is moving, and issue a notification of the predicted danger.

Another embodiment of the present invention is a danger spot identification method in a danger spot identification device including a past information acquisition unit, a surrounding information acquisition unit, and a danger spot identification unit, the danger spot identification method comprising: a first step in which the past information acquisition unit acquires past information which is generated on the basis of an event in the past and is used for identifying a danger spot, and which includes information related to the event; a second step in which the surrounding information acquisition unit acquires surrounding information related to a surrounding situation of a moving object; and a third step in which the danger spot identification unit identifies a danger spot within a region of movement of the moving object, on the basis of the past information and the surrounding information. As a result, by having the danger spot identification device execute the danger spot identification method, the danger spot identification unit can identify a spot of a danger which can occur due to a past event. Therefore, a danger spot can be identified effectively.

Another embodiment of the present invention is a program which causes a computer to execute a danger spot identification method in a danger spot identification device including a past information acquisition unit, a surrounding information acquisition unit, and a danger spot identification unit, the program comprising: a first step in which the past information acquisition unit acquires past information which is generated on the basis of an event in the past and is used for identifying a danger spot, and which includes information related to the event; a second step in which the surrounding information acquisition unit acquires surrounding information related to a surrounding situation of a moving object; and a third step in which the danger spot identification unit identifies a danger spot within a region of movement of the moving object, on the basis of the past information and the surrounding information. As a result, by causing a computer to execute the danger spot identification method in the danger spot identification device, the danger spot identification unit can identify a spot of a danger which can occur due to a past event. Therefore, a danger spot can be identified effectively.

[Working Example]

Hereunder, a navigation device 10 according to the present working example will be described, with reference to the drawings. The navigation device 10 is configured as a device which is mounted on a vehicle (automobile), searches for a traveling route of the vehicle, and performs route guiding on the basis of the found route. The navigation device 10 is also configured as a device which identifies a spot where a person, a vehicle, or the like may jump out to the roadway as a "jump-out danger spot" and notifies the occupant of the vehicle accordingly. The navigation device 10 is an example of the "danger spot identification device" of the present invention, the vehicle is an example of the "moving object" of the present invention, and the jump-out danger spot corresponds to the "danger spot" of the present invention.

As shown in FIG. 1, the navigation device 10 includes a GPS receiver 12, an independent positioning sensor 14, a surrounding detection unit 16, a memory storage unit 18, a display unit 20, a speaker 22, a past information acquisition unit 24, a communication unit 26, and a control unit 30. Hereunder, each configuration of the navigation device 10 will be described.

GPS Receiver

The GPS receiver 12 receives signals from GPS satellites and determines a current position of the vehicle. The GPS receiver 12 then outputs information of the determined vehicle current position to the control unit 30.

Independent Positioning Sensor

The independent positioning sensor 14 includes an acceleration sensor, an angular velocity sensor, and a distance sensor. The acceleration sensor detects an acceleration of the vehicle and outputs acceleration data to the control unit 30. The angular velocity sensor includes, for example, a gyro, detects an angular velocity of the vehicle when the direction of the vehicle changes, and outputs data of the angular velocity to the control unit 30. The distance sensor measures vehicle speed pulses composed of pulse signals generated by wheel rotation, and outputs distance data to the control unit 30.

Surrounding Detection Unit

The surrounding detection unit 16 includes a lidar (Light Detection and Ranging) and a camera. The lidar is installed, at both vehicle widthwise ends of the front and rear bumpers of the vehicle, for example. Then, the lidar measures the scattered light caused by a laser light irradiated in a pulsated manner to thereby acquire the distance and the shape of an object irradiated with the laser light, and detects a pedestrian around the vehicle, a planimetric feature on the road on which the vehicle is traveling, and a planimetric feature around the vehicle. The camera is mounted, for example, at the vehicle widthwise center of a windshield glass of the vehicle. The camera captures the surroundings of the vehicle and detects, from the captured image data, a pedestrian, a planimetric feature on the road on which the vehicle is traveling, a feature around the road, and so forth. The surrounding detection unit 16 is an example of the "information acquisition unit" of the present invention.

Memory Storage Unit

The memory storage unit 18 includes a memory storage medium such as an HDD (Hard Disk Drive), and is electrically connected to the control unit 30. The memory storage unit 18 stores map data for performing route searching and route guiding. This map data includes position information of roads, shape information of roads, position information of intersections and branch points, and information related to planimetric features on a map.

Display Unit

The display unit 20 includes a touch panel having a display surface. The display unit 20 displays, for example, a map around the own position of the vehicle, and a marking of the vehicle is displayed so as to be superimposed on the map.

Speaker

The speaker 22 is configured as, for example, a device which is controlled by a control unit 30 described later to announce route guiding information by voice while the vehicle is traveling.

Past Information Acquisition Unit

The past information acquisition unit 24 is communicatively connected to an external server 40 via the communication unit 26. The past information acquisition unit 24 acquires, from the external server 40, past information which indicates information related to a traffic accident in the past. Hereunder, the past information will be described.

The past information includes information which is generated on the basis of an event in the past and relates to the event. Specifically, the past information is information which primarily indicates the situation of a past traffic accident involving a jump-out accident. The past information includes identification information used when identifying a jump-out danger spot on the road on which the vehicle is traveling by means of a danger spot identification unit 34 described later. Specifically, as shown in FIG. 2, the past information includes moving object identification information, planimetric feature identification information, weather identification information, and time identification information as identification information, and these pieces of information correspond to each jump-out accident case.

The moving object identification information is information for identifying, by means of the danger spot identification unit 34 described later, a moving object with a possibility of jumping out to the roadway. This moving object identification information is information related to a moving object which jumped out to the roadway in a jump-out accident in the past (that is, a moving object related to the accident which is also an element understood as a "relevant, moving object", and this moving object is hereunder referred to as "jump-out object"). Specifically, the moving object identification information includes information indicating which of a pedestrian, a four-wheel vehicle, and a two-wheel vehicle the jump-out object was. In a case where the jump-out object was a pedestrian (a person), information as to whether the pedestrian being an adult or a child is also included as information of the jump-out object. Also, in a case where the jump-out object was a two-wheel vehicle, information as to whether the two-wheel vehicle being a bicycle or a motorcycle is also included as information of the jump-out object.

The planimetric feature identification information is information related to a planimetric feature (facility) and is used for identifying a danger spot by means of the danger spot identification unit 34 described later. The planimetric feature identification information is information related to a planimetric feature which was present in a region where a jump-out accident occurred in the past (this planimetric feature is hereunder referred to as "identification planimetric feature"). The planimetric feature identification information includes surrounding facility identification information and road planimetric feature identification information.

The surrounding facility identification information includes information related to an identification planimetric feature (facility) around a region at the time of an accident where the accident occurred. That is to say, the planimetric feature identification information includes the surrounding facility identification information because in a jump-out accident, there is a possibility of a jump-out object jumping out to the roadway due to the planimetric feature (facility) around the region where the accident occurred. The surrounding facility identification information includes first facility information, second facility information, and facility related information.

Figure 3:
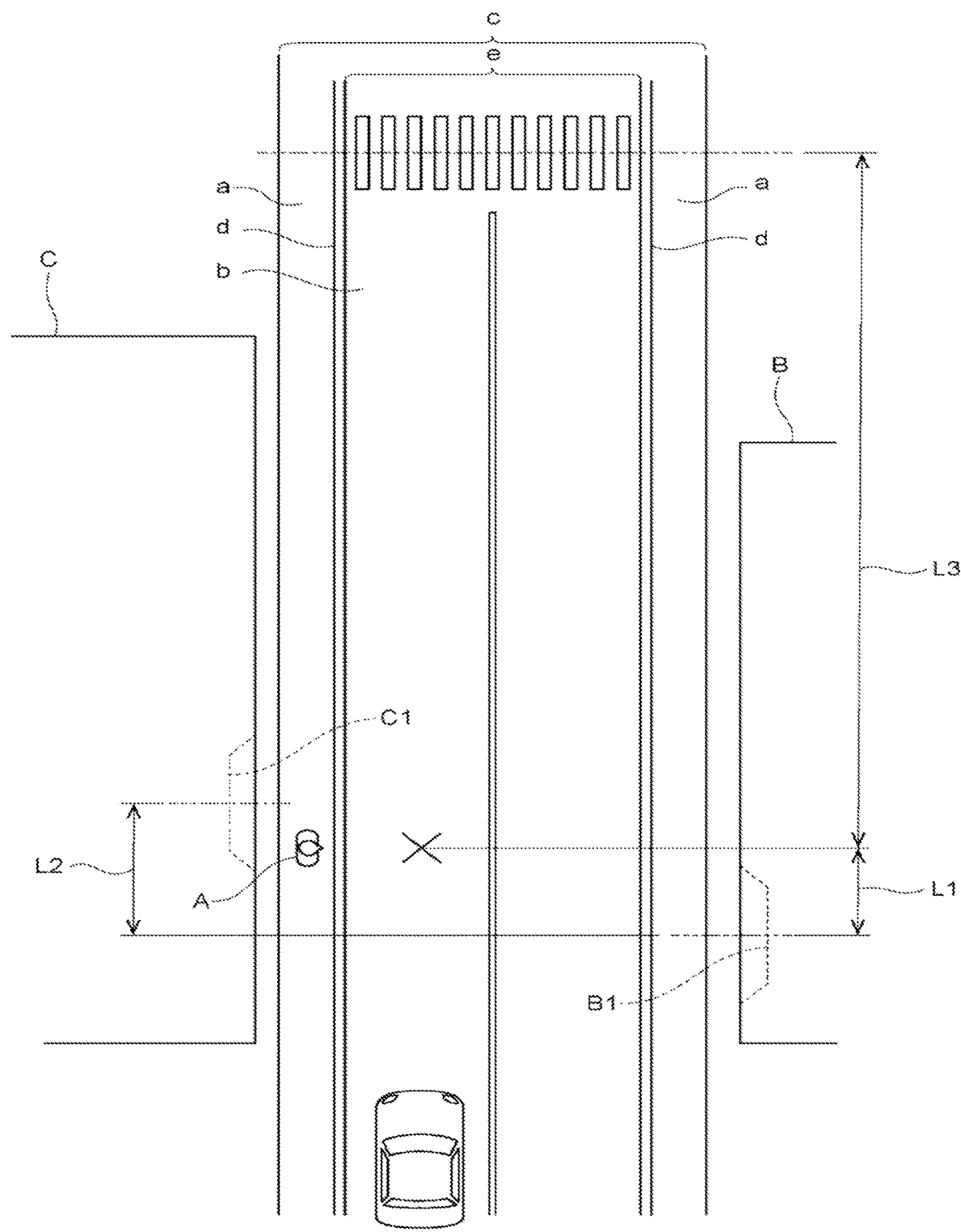
FIG. 3 is an explanatory diagram for describing the past information shown in FIG. 2.

The first, facility information indicates information of a first facility present at the destination of the jump-out object crossing the road (that is, a facility present at a position facing the jump-out object across the roadway). For example, as shown in FIG. 3, in an accident where a jump-out object A is taken as a pedestrian and the jump-out object A jumps out to a roadway b from a walkway a on the left side of FIG. 3, a facility present on the forward side of the jump-out object A across the road c is taken as a facility B. That is to say, in a jump-out accident, for example, there is a possibility that the pedestrian as the jump-out object A may jump out to the roadway b in order to quickly arrive at the first facility B present at the destination of road crossing. For this reason, the first facility information is set in the surrounding facility identification information.

The first facility information includes information indicating the type of the first facility B and the positional relationship between an entrance/exit B1 of the first facility B and an accident occurrence point (the point indicated by the marking "X") (in other words, a distance L1 between the jump-out object A and the entrance/exit B1 of the facility in the extending direction of the road). Here, examples of the types of facility include public facilities such as hospital, library, municipal office, civic center, and childcare center, and commercial facilities such as eating establishment and retail establishment (such as department store, supermarket, and convenience store).

The second facility information indicates information of a facility which was present on the side of a position where the jumping-out was initiated by the jump-out object A. For example, in the example shown in FIG. 3, the facility present on the left side of the road c is a second facility C. That is to say, in a jump-out accident, for example, a vehicle exiting from the exit of a parking lot may jump out to the roadway in order to enter the roadway. For this reason, the second facility information is set in the surrounding facility identification information.

The facility related information indicates, in a case where the first facility B and the second facility C facing each other across the road are present in a region where an accident occurred, information as to whether or not there is a relationship between these facilities. That is to say, for example, in a case where the first facility B is a commercial facility such as department store and the second facility C is a parking lot owned by or affiliating with the commercial facility, in a jump-out accident, there is a possibility that a pedestrian who uses the first facility B may cross the roadway b in order to quickly arrive at the first facility B after parking their vehicle in the parking lot. For this reason, the facility related information is set in the surrounding facility identification information.

As described above, in the case where there is a relationship between the first facility B and the second facility C, the facility related information includes information indicating the presence of the relationship therebetween. The facility related information includes, for example, information indicating a positional relationship (a distance L2 in FIG. 3) between the entrance/exit B1 of the first facility B and an entrance/exit C1 of the second facility C.

As shown in FIG. 2, the road planimetric feature identification information includes information related to identification planimetric features of a road in a region where a jump-out accident occurred. Specifically, the road planimetric feature identification information has information related to a separator d between the roadway b and the walkway a (see FIG. 3) on the road in the region where the jump-out accident occurred. More specifically, the road planimetric feature identification information includes information on presence or absence of a separator on the road, and information on the type of the separator (such as white line, curb, and guardrail) if the separator is present. That, is to say, this information is set in the road planimetric feature identification information because, in a jump-out accident, there is a higher possibility of a pedestrian crossing the road in a case where the separator between the roadway and the walkway is a separating line, compared to a case of the separator being a guardrail, for example.

The road planimetric feature identification information includes information as to whether or not there is a pedestrian crossing e (see FIG. 3) within a predetermined distance before and after the point where the jump-out accident occurred, and information as to whether or not there are traffic lights at the pedestrian crossing e if the pedestrian crossing e is present. That is to say, in a jump-out accident, there is a possibility that a pedestrian may, without getting to the pedestrian crossing e first, cross the road from a front position or a rear position or the pedestrian crossing e, which has no traffic lights. For this reason, these pieces of information are set in the road planimetric feature identification information. The road planimetric feature identification information includes information of a distance L3 (see FIG.

3) between the pedestrian crossing e with no traffic lights and the point where the accident occurred.

The road planimetric feature identification information includes road information of the region where the jump-out accident occurred. This road information includes information such as the type (such as national road and prefectural road), the width, the number of lanes, and so forth of the road.

The weather identification information is information related to the weather at the time of the jump-out accident occurrence. Specifically, included are information such as fine weather, cloudy weather, rainy weather, snowy weather, and so forth at the time of the jump-out accident occurrence.

The time identification information includes information related to the hour of day at the time of the jump-out accident occurrence.

In the present working example, as described above, the navigation device 10 is communicatively connected to the external server 40, and therefore, the map data stored in the memory storage unit 18 may be acquired from the external server 40.

Control Unit

As shown in FIG. 1, the control unit 30 detects a position of the own vehicle on the basis of information determined by the GPS receiver 12 and the independent positioning sensor 14. The control unit 30 searches for a route according to a destination input, and also performs route guiding control on the display unit 20 and the speaker 22 on the basis of the found route. The control unit 30 includes a function configuration unit which performs, on the road on which the vehicle is traveling, identification of a jump-out danger spot. Hereunder, the function configuration unit of the control unit 30 will be described.

The control unit 30 includes a surrounding information acquisition unit 32 and the danger spot identification unit 34 for identifying a jump-out point.

The surrounding information acquisition unit 32 acquires surrounding information related to the surroundings of the vehicle in a traveling state while associating it with each identification information (moving object identification information, planimetric feature identification information, weather identification information, and time identification information) of the past information described above. That is to say, on the basis of the information detected by the surrounding detection unit 16, the surrounding information acquisition unit 32 detects a jump-out object which is positioned on a side of the road and may possibly jump out to the roadway. If the jump-out object detected by the surrounding information acquisition unit 32 is a person (a pedestrian), the surrounding information acquisition unit 32 detects the object as an adult or a child on the basis of the physique of the object. If the jump-out object detected by the surrounding information acquisition unit 32 is a vehicle, the surrounding information acquisition unit 32 detects the object as a two-wheel vehicle or a four-wheel vehicle. If the jump-out object detected by the surrounding information acquisition unit 32 is a two-wheel vehicle, the surrounding information acquisition unit 32 detects the object as a bicycle or a motorcycle.

On the basis of the information detected by the surrounding detection unit 16, the surrounding information acquisition unit 32 detects a planimetric feature around the vehicle or a road planimetric feature. For example, the surrounding information acquisition unit 32 detects a facility facing the pedestrian detected by the surrounding detection unit 16 across the road (a facility corresponding to the first facility), or a facility present on the pedestrian side of the road (a facility corresponding to the second facility). The surrounding information acquisition unit 32 acquires information such as facility name and type of the detected facility from the memory storage unit 18.

The surrounding information acquisition unit 32 acquires weather information around the vehicle on the basis of the information detected by the surrounding detection unit 16. The surrounding information acquisition unit 32 acquires a current time on the basis of time information from a GPS satellite received by the GPS receiver 12. When the surrounding information acquisition unit 32 detects the weather information as rainy weather, the rain (weather) around the vehicle may be detected by detecting an ON signal of a wiper device on the vehicle.

Figure 4:
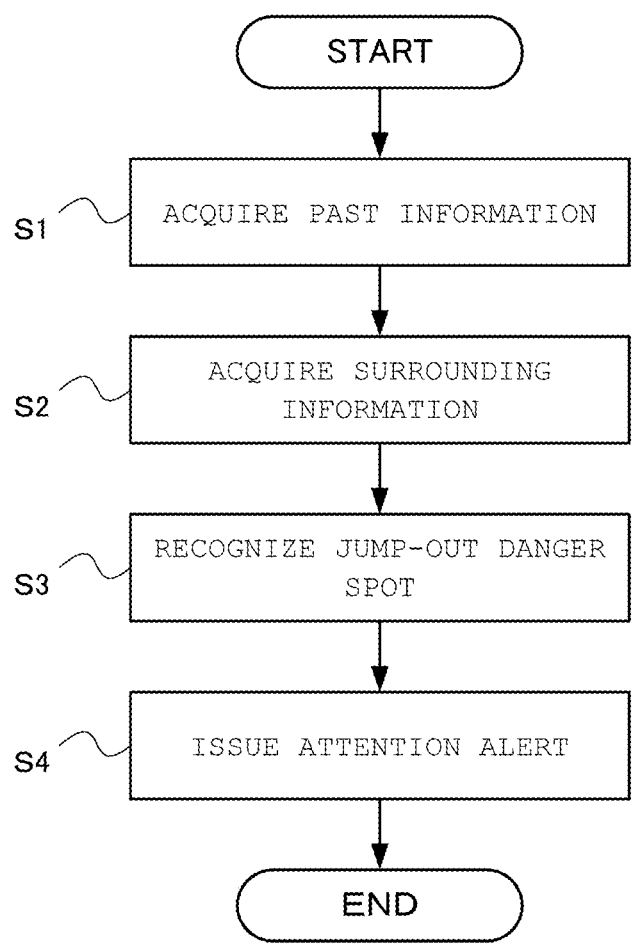
FIG. 4 is a flowchart showing a flow of an operation at a time when the navigation device shown in FIG. 1 identifies a jump-out danger spot.

Next, with reference to FIG. 4, an operation of the navigation device 10 at a time of identifying a jump-out danger spot will be described, and the working and effect of the present working example will be described.

First, in the navigation device 10, the past information acquisition unit 24 acquires past information from the external server 40 (Step S1).

The surrounding information acquisition unit 32 then acquires surrounding information related to the surroundings of the vehicle, on the basis of the information from the surrounding detection unit 16. Specifically, the surrounding information acquisition unit 32 detects and acquires a jump-out object which is present on the forward side of the vehicle and may possibly jump out to the roadway, a road planimetric feature, and a planimetric feature around the vehicle (Step S2).

Upon the surrounding information acquisition unit 32 acquiring the surrounding information of the jump-out object, the road planimetric feature, and the planimetric feature around the vehicle, the danger spot identification unit 34 identifies a jump-out danger spot on the basis of the past information acquired by the past information acquisition unit 24 and the surrounding information acquired by the surrounding information acquisition unit 32 (Step S3). Specifically, the danger spot identification unit 34 determines the degree of similarity between the information indicating the situation of the jump-out accident in the past information and the surrounding information on the surroundings of the vehicle acquired by the surrounding information acquisition unit 32. In the danger spot identification unit 34, if the current traveling situation is determined as having a similarity to each identification information in the past information, the spot is identified as a jump-out danger spot.

Upon the danger spot identification unit 34 identifying the jump-out danger spot, the control unit 30 controls the display unit 20 and/or the speaker 22 to issue a notification to the occupant of the vehicle indicating the presence of the jump-out danger spot ahead. For example, an attention alert such as "XX meters ahead, the pedestrian on the left may be headed toward YY department store and may cross the road in front of your vehicle. Reduce your speed and take extra care." is issued on and/or from the display unit 20 and/or the speaker 22. After having executed the process of Step S4, the operation process ends.

As described above, according to the navigation device 10 of the present working example, the danger spot identification unit 34 identifies a jump-out danger spot on the basis of the past information which is acquired by the past information acquisition unit 24 and indicates the situation of a jump-out accident in the past, and the surrounding information which is acquired by the surrounding information acquisition unit 32 and indicates the surrounding situation of the vehicle.

The past information includes information which is generated on the basis of an event in the past (a jump-out accident in the past) and relates to the event. Specifically, the past information includes surrounding facility identification information (information related to an identification planimetric feature) used for identifying a jump-out danger spot and information related to a jump-out object. As a result, the danger spot identification unit 34 can identify a danger spot of a jump-out which can occur due to a planimetric feature (facility) in a jump-out accident. Therefore, the navigation device 10 can identify a jump-out danger spot effectively.

The surrounding facility identification information in the past information includes information related to the first facility which is present across the road from the jump-out object. As a result, it is possible to more effectively identify a jump-out danger spot of a jump-out accident. That is to say, in a jump-out accident, there is a possibility that, for example, a pedestrian as a jump-out object may be drawn to the first facility which is present across the road and may cross the road (roadway). Accordingly, it is possible to effectively identify a danger spot having a similarity to the situation of a jump-out accident in the past, by making reference to the positional relationship between the pedestrian and the first facility facing the pedestrian across the road and the type of the first facility in the past information. Therefore, it is possible to more effectively identify a danger spot of a jump-out accident which can occur due to a planimetric feature.

The surrounding facility identification information in the past information includes information as to whether or not there is a relationship between the first facility and the second facility. Accordingly, the danger spot identification unit 34 can identify a jump-out danger spot on the basis of whether or not there is a relationship between the first facility and the second facility facing each other across the road. That is to say, for example, if the first facility and the second facility facing each other are an entrance/exit of a commercial facility and a parking lot owned by the commercial facility respectively, a pedestrian using the commercial facility may possibly cross the roadway in order to quickly arrive at the commercial facility or the parking lot. Moreover, for example, if the facilities facing each other are an entrance/exit of a park and an entrance/exit of a commercial facility such as a convenience store, a pedestrian using the park may possibly cross the roadway in order to use the convenience store. Therefore, the danger spot identification unit 34 can identify a jump-out danger spot to respond to situations where the first facility and the second facility are related to each other as described above.

The surrounding facility identification information in the past information includes information of the second facility which was present on the side of a position where a jumping-out was initiated by the jump-out object. Accordingly, the danger spot identification unit 34 can identify a jump-out danger spot on the basis of the type and so forth of the facility present on a side of the road. That is to say, for example, if the planimetric feature which is present on a side of the road is an exit of a parking lot and a vehicle leaving the exit has stopped, the vehicle may possibly jump out to the roadway. Moreover, if the facility which is present on a side of the road is an exit of a bike parking lot and a two-wheel vehicle such as bicycle and motorcycle leaving the exit has stopped, the two-wheel vehicle may possibly jump out to the roadway. Accordingly, the danger spot identification unit 34 can identify a jump-out danger spot to respond to this type of situation.

In the present working example, the navigation device 10 identifies a jump-out danger spot, however, map data may be created using information which indicates a jump-out danger spot identified by the navigation device 10. For example, in each vehicle, information indicating a jump-out danger spot identified by the navigation device 10 may be transmitted to the external server 40, and the map data including danger determination information for determining a danger during traveling may be generated in the external server 40.

Hereunder, an example of a structure of map data 50 generated in the external server 40 will be described, with reference to FIG. 5. As shown in FIG. 5A, the map data 50 includes road region data 52, intersection region data 54, road surrounding planimetric feature data 56, road related planimetric feature data 58, road data 60, and danger determination information data 62.

The road region data 52 includes information indicating a region on each road (a roadway on which a vehicle travels, a walkway on which a pedestrian walks) together with position information on each road.

The intersection region data 54 includes information which indicates a region at each intersection and is associated with the position information of each intersection.

The road surrounding planimetric feature data 56 includes information related to planimetric features which are present on sides of each road. For example, the road surrounding planimetric feature data 56 includes information such as the types and the names of facilities as planimetric features, and the entrance/exit of facilities.

The road related planimetric feature data 58 includes data related to each road which is present in each road region. For example, the road related planimetric feature data 58 includes information such as separators which separate the roadway and the walkway from each other (such as separating line, curb, and guardrail), separators which divide the roadway (such as diagonal lines, and cat's eye), and poles.

The road data 60 includes information which indicates a road network by means of nodes and links. In other words, the road data 60 indicates a portion showing a road connection portion such as intersection as a node, and represents a road network in which nodes are connected by the links.

The darker determination information data 62 is information for performing danger determination generated on the basis of the information indicating a jump-out danger spot identified by the navigation device 10 of each vehicle. As shown in FIG. 5B, this danger determination information data has an ID assigned to each danger determination information, and each danger determination information includes position information, information related to a jump-out object, planimetric feature related information corresponding to an identification planimetric feature, and danger situation information indicating the content of a danger.

The position information in the danger determination information is information indicating the position of a jump-out danger spot identified in the navigation device 10 of each vehicle, and is indicated by latitude and longitude in the present working example. Accordingly, each danger determination information is associated with a road region and an intersection region on the basis of this position information. That is to say, the road region and the intersection region correspond to an example of the "region" of the present invention.

The information related to a jump-out object in the danger determination information is information indicating a jump-out object at a jump-out danger spot identified in the navigation device 10 of each vehicle. That is to say, for example, danger determination information of ID 1 shown in FIG. 5B indicates a pedestrian as a jump-out object, danger determination information of ID 2 indicates a four-wheel vehicle as a jump-out object, and danger determination information of ID 3 indicates a two-wheel vehicle as a jump-out object.

The planimetric feature related information corresponding to an identification planimetric feature in the danger determination information is information indicating a planimetric feature corresponding to an identification planimetric feature at a jump-out danger spot identified by the navigation device 10 of each vehicle. That is to say, for example, the danger determination information of ID 1 shown in FIG. 5B indicates a commercial facility as an identification planimetric feature, the danger determination information of ID 2 indicates a parking lot exit as an identification planimetric feature, and the danger determination information of ID 3 indicates a parking lot entrance as an identification planimetric feature.

The information indicating a danger content in the danger determination information is information which indicates a danger content at a jump-out danger spot identified in the navigation device 10 of each vehicle. For example, the danger determination information of ID 1 shown in FIG. 5B indicates that there is a danger of a pedestrian jumping out as a result of crossing the road toward a department store. The danger determination information of ID 2 indicates that there is a danger of a four-wheel vehicle, which exited from the parking lot exit, jumping out to the roadway, and the danger determination information of ID 3 indicates that there is a danger of a two-wheel vehicle jumping out to the roadway as a result of turning right to enter the parking lot entrance.

The map data 50 configured in this manner is acquired in the navigation device 10 of each vehicle and stored in the memory storage unit 18 of the navigation device 10, thereby enabling prediction of a danger with use of the map data 50 while the vehicle is traveling.

For example, when the vehicle is positioned before the point corresponding to the danger determination information of ID 1 shown in FIG. 5B and the surrounding information acquisition unit 32 of the navigation device 10 detects a pedestrian ahead of the vehicle, it is possible, through the speaker 22 or the like, to notify the occupant of the vehicle that there is a danger of a pedestrian jumping out to the roadway. For example, it is possible to issue to the occupant of the vehicle a guidance notification such as "The pedestrian ahead may be headed to XX department store and may jump out to the roadway. Reduce your speed.".

It is thus possible to predict a danger while the vehicle is traveling and notify the occupant accordingly, by having the data structure of the map data 50 made as a structure including the danger determination information and using the map data 50 having this data structure in the navigation device 10 as described above. Moreover, the danger determination information in the map data 50 includes information indicating the content of a danger. As a result, it is possible, by means of the navigation device 10, to notify the occupant in advance of the information on the basis of the content of a danger.

The vehicle on which the navigation device 10 is mounted is not particularly specified in the present working example, however, the vehicle may be a manually-operated vehicle or an automatic-driving-capable vehicle. In the case where the vehicle is an automatic-driving-capable vehicle, the brake device of the vehicle may be controlled to brake the vehicle so as to cause the vehicle to travel at a relatively lower speed when the navigation device 10 identifies a jump-out danger spot.

In the present working example, the past information acquired by the past information acquisition unit 24 is information related to a past jump-out accident, however, the past information acquisition unit 24 may acquire, for example, information related to the situation of a frequently occurring jump-out accident only. As a result, it is possible to accurately identify a jump-out danger spot in the danger spot identification unit 34.

The navigation device 10 of the present invention can be realized by recording the processing of the navigation device 10 in a recording medium readable on a computer system, and by reading and executing, in the navigation device 10, a program recorded in the recording medium. The "computer system" mentioned here includes an operating system and hardware such as peripheral devices.

The "computer system" may include a homepage providing environment (or a homepage display environment) if a WWW (World Wide Web) system is in use. The above program may be transmitted from a computer system having this program stored in a memory storage device or the like to another computer system via a transmission medium or by means of a transmission wave in the transmission medium. Here, the "transmission medium" for transmitting the program refers to a medium having a function of transmitting information, such as a network (a communication network) including the Internet and a communication line including a telephone line.

The above program may realize a part of the functions described above. Furthermore, the program may be a so-called difference file (a difference program) which can realize the functions mentioned above in combination with a program already recorded in a computer system.

The embodiment and the working example of the present invention have been described above in detail with reference to the drawings. However, the specific configuration of the invention is not limited to the embodiment or the working example, and other designs may be included without departing from the scope of the invention.

DESCRIPTION OF REFERENCE SIGNS

10 Navigation device (danger spot identification device)
16 Surrounding detection unit (information acquisition unit)
24 Past information acquisition unit
32 Surrounding information acquisition unit
34 Danger spot identification unit
50 Map data

The invention claimed is:
1. A danger spot identification device comprising:
a past information acquisition unit for acquiring past information which is generated on a basis of an event in the past and is used for identifying a danger spot, and which includes information related to the event;
a surrounding information acquisition unit for acquiring surrounding information related to a surrounding situation of a moving object; and
a danger spot identification unit for identifying a danger spot within a region of movement of the moving object, on the basis of the past information and the surrounding information,
wherein the past information includes information related to a relevant moving object, which is a moving object related to an accident, and a planimetric feature, the relevant moving object and the planimetric feature facing each other on opposite sides of a road on which a vehicle is traveling, and wherein the danger spot identification unit identifies a danger spot on a basis of a degree of similarity between a surrounding situation indicated by the surrounding information and a positional relationship between the relevant moving object and the planimetric feature in a region where the accident occurred.

2. The danger spot identification device according to claim 1, wherein the past information includes information related to an occurrence of the accident in the past, and wherein the danger spot identification unit identifies the danger spot on the basis of past information on the region where the accident occurred at a time of the accident where the accident occurred, and on the surrounding information.

3. The danger spot identification device according to claim 1, wherein the past information includes surrounding facility identification information, including information related to the planimetric feature, used for identifying a jump-out danger spot and information related to a jump-out object, and wherein the danger spot identification unit deteimines a degree of similarity between the information indicating the situation of a jump-out accident in the past information and the surrounding information on surroundings of the vehicle acquired by the surrounding information acquisition unit, if a current traveling situation is determined as having a similarity to each identification information in the past information, the spot is identified as the jump-out danger spot.

4. The danger spot identification device according to claim 3, wherein the information related to the planimetric feature includes information related to relevance between a first facility and a second facility facing each other across the road, and wherein the danger spot identification unit identifies the danger spot on a basis of a surrounding situation indicated by the surrounding information and relevance between the first facility and the second facility in a region where the accident occurred.

5. A danger spot identification method in a danger spot identification device which includes a past information acquisition unit, a surrounding information acquisition unit, and a danger spot identification unit, the danger spot identification method comprising:

a first step in which the past information acquisition unit acquires past information which is generated on a basis of an event in the past and is used for identifying a danger spot, and which included information related to the event;

a second step in which the surrounding information acquisition unit acquires surrounding information related to a surrounding situation of a moving object; and a third step in which the danger spot identification unit identifies a danger spot within a region of movement of the moving object, on the basis of the past information and the surrounding information, wherein the past information includes information related to a relevant moving object, which is the moving object related to an accident, and a planimetric feature, the relevant moving object and the planimetric feature facing each other on opposite sides of a road on which a vehicle is traveling, and wherein, in the third step, the danger spot identification unit identifies the danger spot on a basis of a degree of similarity between a surrounding situation indicated by the surrounding information and a positional relationship between the relevant moving object and the planimetric feature in a region where the accident occurred.

6. A non-transitory computer readable medium storing a program which causes a computer to execute a danger spot identification method in a danger spot identification device including a past information acquisition unit, a surrounding information acquisition unit, and a danger spot identification unit, the program comprising:

a first step in which the past information acquisition unit acquires past information which is generated on a basis of an event in the past and is used for identifying a danger spot, and which includes information related to the event;

a second step in which the surrounding information acquisition unit acquires surrounding information related to a surrounding situation of a moving object; and a third step in which the danger spot identification unit identifies a danger spot within a region of movement of the moving object, on the basis of the past information and the surrounding information, wherein the past information includes information related to a relevant moving object, which is the moving object related to an accident, and a planimetric feature, the relevant moving object and the planimetric feature facing each other on opposite sides of a road on which a vehicle is traveling, and wherein, in the third step, the danger spot identification unit identifies the danger spot on a basis of a degree of similarity between a surrounding situation indicated by the surrounding information and a positional relationship between the relevant moving object and the planimetric feature in a region where the accident occurred.

* * * * *